Feb. 22, 1955 M. C. DUNCAN 2,702,836

TELEPHONE HOLDER

Filed April 27, 1954 2 Sheets-Sheet 1

Morris C. Duncan
INVENTOR.

BY Clarence A. O'Brien
and Harvey B. Jacobson
Attorneys

Feb. 22, 1955 M. C. DUNCAN 2,702,836

TELEPHONE HOLDER

Filed April 27, 1954 2 Sheets-Sheet 2

Morris C. Duncan
INVENTOR.

BY Clarence A. O'Brien
and Harvey B. Jacobson
Attorneys

United States Patent Office 2,702,836

Patented Feb. 22, 1955

2,702,836

TELEPHONE HOLDER

Morris C. Duncan, Russellville, Ky., assignor of thirty-five per cent to Cecile M. Duncan, fifteen per cent to Norman L. Duncan, and fifteen per cent to Jane D. Norton, of Russellville, Ky.

Application April 27, 1954, Serial No. 425,781

1 Claim. (Cl. 179—148)

This invention comprises novel and useful improvements in a telephone holder and more specifically pertains to a device adapted for attachment to a conventional desk-type telephone for supporting the receiver thereof upon a flexible arm in selected positions.

The principal object of this invention is to provide an attachment which may be readily applied to conventional desk phones and which will offer a flexible arm for supporting the phone receiver in any desired selected position thereby freeing the hands of the user for other purposes.

A further object of the invention is to provide an attachment in conformity with the foregoing objects which shall provide a means for positively depressing the receiver actuated contact points when the phone is not in use.

Yet another object of the invention is to provide an attachment in accordance with the preceding object which shall be of lightweight, inexpensive construction, and will closely embrace the base of a desk phone in an unobtrusive manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 5:
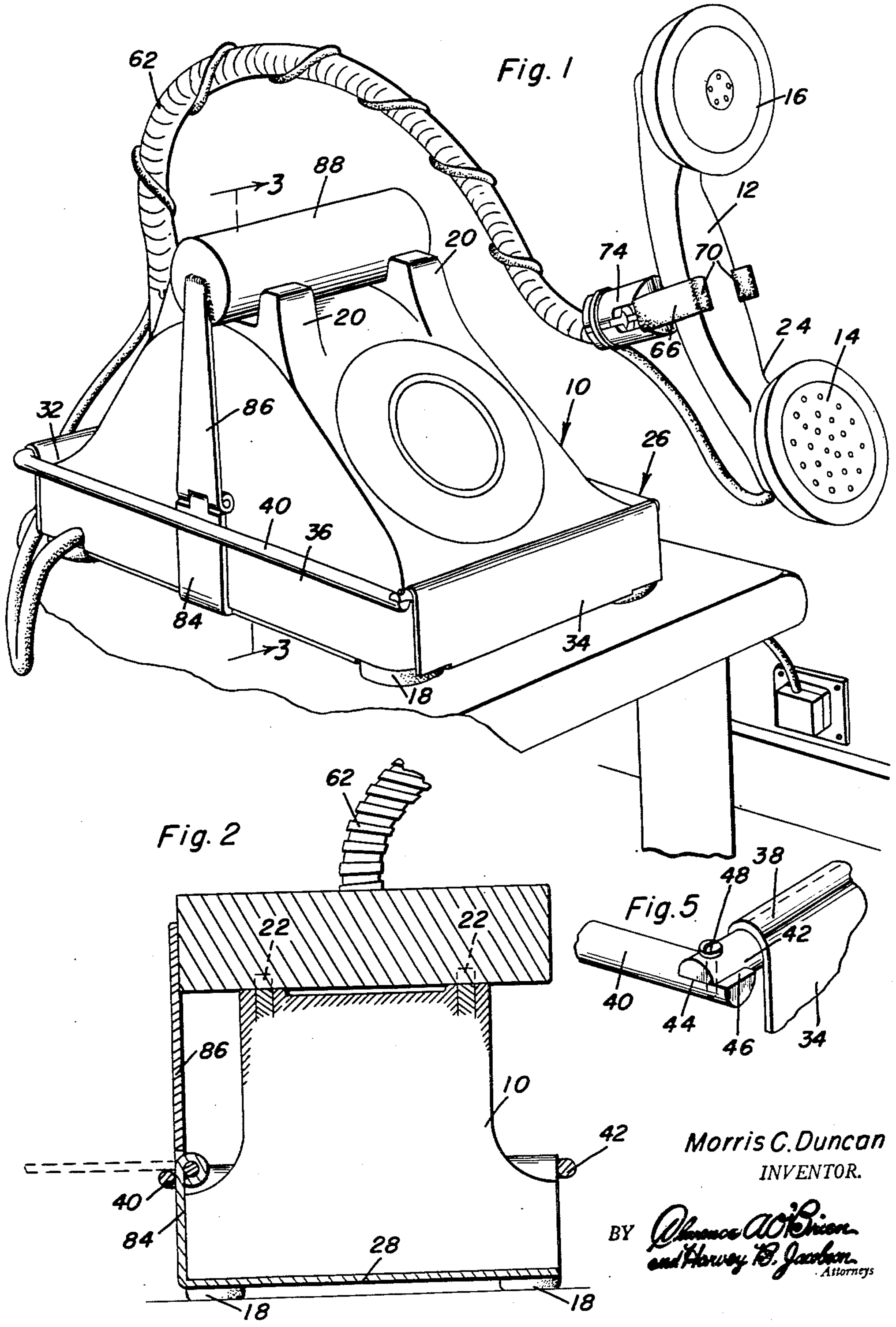
Figure 1 is a perspective view showing a conventional form of desk telephone to which the hand set supporting attachment of the present invention has been applied, the circuit disconnecting device being shown in circuit breaking position.
Figure 2 is a vertical transverse sectional view through a portion of the base of a desk phone showing the attachment applied thereto, the circuit breaking element being shown in full lines in circuit breaking position and dotted lines in circuit opening position.
Figure 5 is a detailed view in perspective of a portion of the framework of the attachment by which the same is mounted upon the base of a desk phone.

Indicated by the numeral 10 is a conventional form of desk phone, the same having a telephone hand set 12 upon one end of which is provided the usual telephone mouthpiece 14 and upon the other end of which is carried the ear-piece or receiver 16. In phones of this type the base of the instrument is usually provided with four supporting legs 18 together with a cradle 20 upon which the hand set is usually supported when the phone is not in use. As is customary in this type of phones, there are provided a pair of switch actuating rods 22, see Figure 2, disposed within the cradle and upon which the handle portion 24 of the receiver is adapted to rest when the phone is not in use. The weight of the handle portion of the receiver upon the rods 22 serves to break the circuit, which circuit is closed when the receiver is lifted from this cradle.

It is with an instrument of this type that the attachment forming the subject matter of this invention is specifically adaped.

Figure 3:
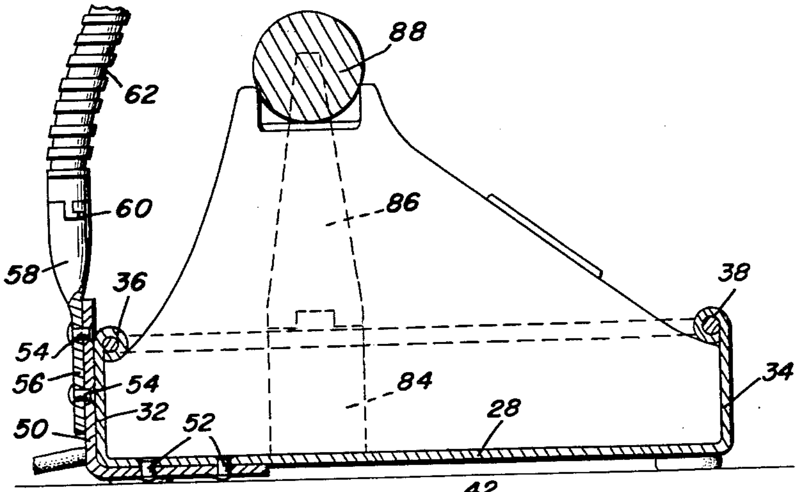
Figure 3 is a vertical transverse sectional view taken substantially upon the plane indicated by the section line 3—3 of Figure 1, the circuit breaking device being shown in circuit breaking position.
Figures 4, 6, 7, 8:
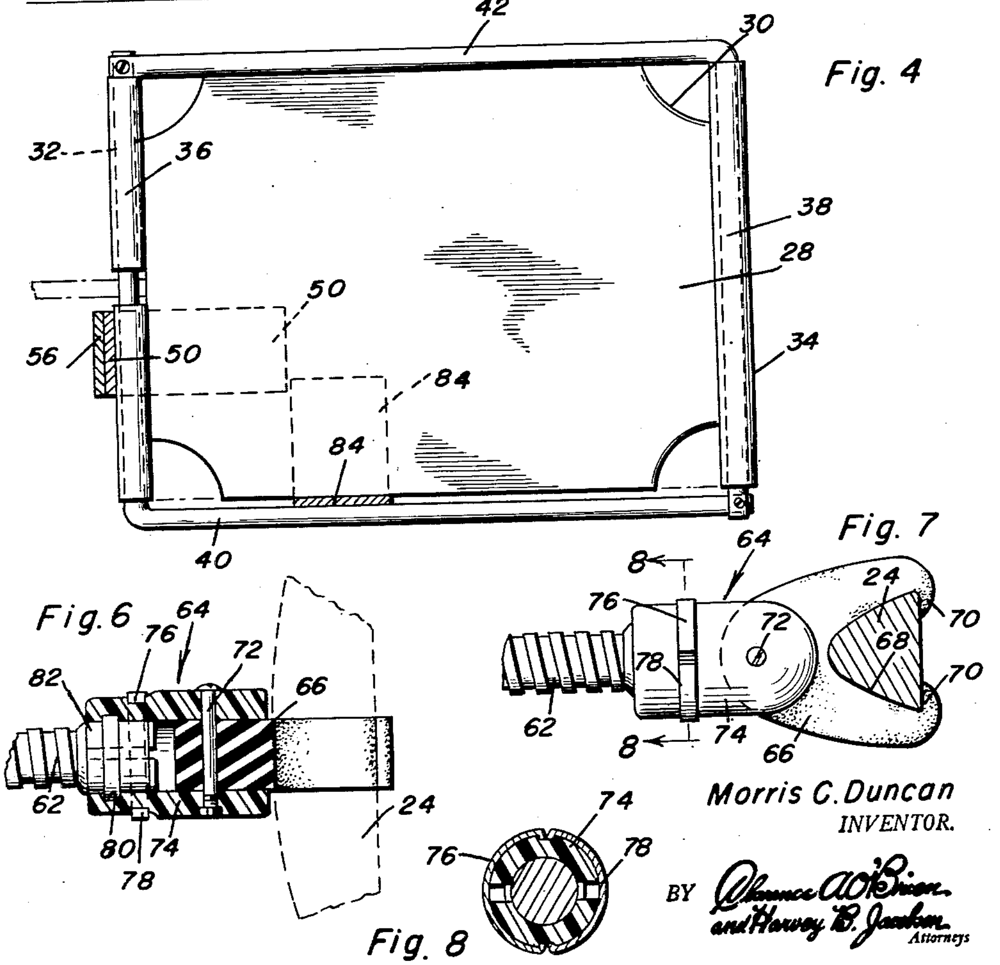
Figure 4 is a horizontal section showing in top plan view the base of the attachment.
Figure 6 is a detailed view in section of the pivoted clamp for holding the hand set.
Figure 7 is an elevational view from a side of the portion of the clamp for the hand set.
Figure 8 is a transverse sectional detail view taken substantially upon the plane indicated by the section line 8—8 of Figure 7.

The telephone holder attachment of this invention consists of a base indicated generally by the numeral 26. This base, as shown in Figures 2–4 consists of a flat sheet metal or plastic bottom wall or base member 28 which at its marginal edges is provided with arcuate or cut-away portions 30 through which the legs 18 of the desk phone are adapted to extend, as shown in Figures 1–3. At its rear and front edges respectively the base member is provided with upstanding rear and front side walls 32 and 34. At their upper edges these walls are inturned to provide hollow beads 36 and 38 respectively and a pair of L-shaped rods 40 and 42 are provided. The rod 40 has one arm extending through the bead 36 of the wall 32, while the rod 42 has an arm extending through the bead 38 of the wall 34. The opposite ends of these two arms are provided with complementary flat portions 44 and 46, see Figure 5, which are detachably connected together as by a screw 48. Thus, the two rods are secured together whereby the base member is clamped upon the base portion of the desk telephone.

An L-shaped bracket has its horizontal leg secured by rivets 52 to the base member 28 of the attachment and rivets 54 are employed to secure the flattened leg portion 56 of a standard 58 to the rear side walls 32. At its upper end the standard has a conventional bayonet slot 60 whereby the correspondingly equipped lower end of a flexible arm 62 may be detachably secured. This arm is of any convenient size, and is adapted to extend above and over the desk telephone and to be moved to different selected positions at the convenience of the user of the telephone. Secured to the upper or outer end of the flexible arm 62 is a holder, indicated generally by the numeral 64 for the telephone hand set. This holder, as shown more clearly in Figures 6–8, consists of a plate-like body 66 having a V-shaped slot 68 in its outer end, this slot having inturned hooks 70. This slot is of sufficient size to tightly embrace the enlarged mid-portion of the receiver handle 24, as shown in Figures 1 and 7, but to permit the end portions of the receiver handle to be readily moved into or out of the slot 68 between the hooks 70. Preferably, the body 66 is of hard rubber or other suitable plastic material. At its rear end the body 66 is pivotally connected as by a screw 72 to the bifurcated extremity of a sleeve 74 of any suitable dielectric material. This sleeve may conveniently comprise a pair of semi-cylindrical segments which may be held together by split rings 76 and 78, whereby an internal annular groove 80 in the end of the sleeve may be detachably retained upon an annular rib 82 mounted upon the end of the flexible arm 62. By this means, the holder and consequently the hand set carried thereby may be tilted in any desired manner and the flexible arm itself may be moved to assist in positioning the hand set at a desired location.

Referring now to Figures 1 and 2 it will be seen that there is provided an upstanding lug or standard 84 rising from an edge of the base member 28 and which has hingedly attached at its upper end an arm 86. The latter at its upper extremity has a perpendicularly disposed cylindrical bar or rod 88 consituting a weight. The weight is such that when the arm and bar are in the position shown in Figure 1, the weight 88 will depress the telephone contacts 22, see Figure 2, whereby the telephone circuit will be broken. When, however, the bar and arm are hinged downwardly about the hinge connected to the members 84 and 86, or to the dotted line position shown in Figure 2, the weight 88 will be removed from the contact members 22 whereby the telephone circuit will be opened and ready for use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A telephone holder comprising a base, means for securing said base to the bottom of a desk phone, a flexible arm mounted upon said base, a clamp on said arm adapted to support a telephone hand set, a weight adapted to depress the hand set actuated switch members of a telephone hinged means mounting said weight upon said base, said base comprising a flat sheet-like plate adapted to be disposed beneath the bottom surface of a desk telephone set, fastening means for securing said plate to a desk telephone set, said plate having upstanding members, a pair of L-shaped rods each secured to one of said upstanding members, means for connecting the ends of said pair of rods whereby said rods comprise a rectangular frame adapted to clamp upon the base portion of a desk telephone set.

References Cited in the file of this patent

UNITED STATES PATENTS

| | | |
|---|---|---|
| 1,306,445 | Standish | June 10, 1919 |
| 2,048,865 | Hufschmid | July 28, 1936 |
| 2,260,703 | Daly | Oct. 28, 1941 |
| 2,473,106 | Mathieson | June 14, 1949 |